US006860838B2

(12) United States Patent
Fox

(10) Patent No.: US 6,860,838 B2
(45) Date of Patent: Mar. 1, 2005

(54) ROLLER ASSEMBLY APPARATUS AND METHOD OF USE

(75) Inventor: Gary Fox, Winona, TX (US)

(73) Assignee: Keys Fitness Products, Inc., Garland, TX (US)

( * ) Notice: Subject to any disclaimer, the term of this patent is extended or adjusted under 35 U.S.C. 154(b) by 50 days.

(21) Appl. No.: 10/209,063

(22) Filed: Jul. 30, 2002

(65) Prior Publication Data

US 2004/0023757 A1 Feb. 5, 2004

(51) Int. Cl.$^7$ .............................................. A63B 22/02
(52) U.S. Cl. ........................ 482/54; 198/842; 193/35 J
(58) Field of Search ............................... 193/37, 35 R, 193/35 F, 35 J, 35 B; 198/780, 842; 384/480; 482/54

(56) References Cited

U.S. PATENT DOCUMENTS 3,650,529 A * 3/1972 Salm et al. .................... 482/54
4,364,556 A * 12/1982 Otte ............................... 482/4
4,872,664 A * 10/1989 Parker .......................... 482/54
5,018,722 A * 5/1991 Whitmore ..................... 482/54

* cited by examiner

Primary Examiner—Justine R. Yu
Assistant Examiner—Tam Nguyen
(74) Attorney, Agent, or Firm—Haynes and Boone, LLP

(57) ABSTRACT

The present invention relates in general to roller assembly apparatuses, and specifically to roller assembly apparatuses used in treadmills. An embodiment of the invention includes a roller apparatus, comprising: a shaft with raised surfaces on each end, a rotatable tube disposed around a portion of the shaft, and bearing assemblies. The bearing assemblies are disposed between the raised surfaces of the shaft and the rotatable tube such that the inner surfaces of the bearing assemblies contact the raised surfaces which allows the inner surfaces of the bearing assemblies to rotate on the raised surfaces, thus eliminating forces on the inner surfaces of the bearing assemblies.

10 Claims, 2 Drawing Sheets

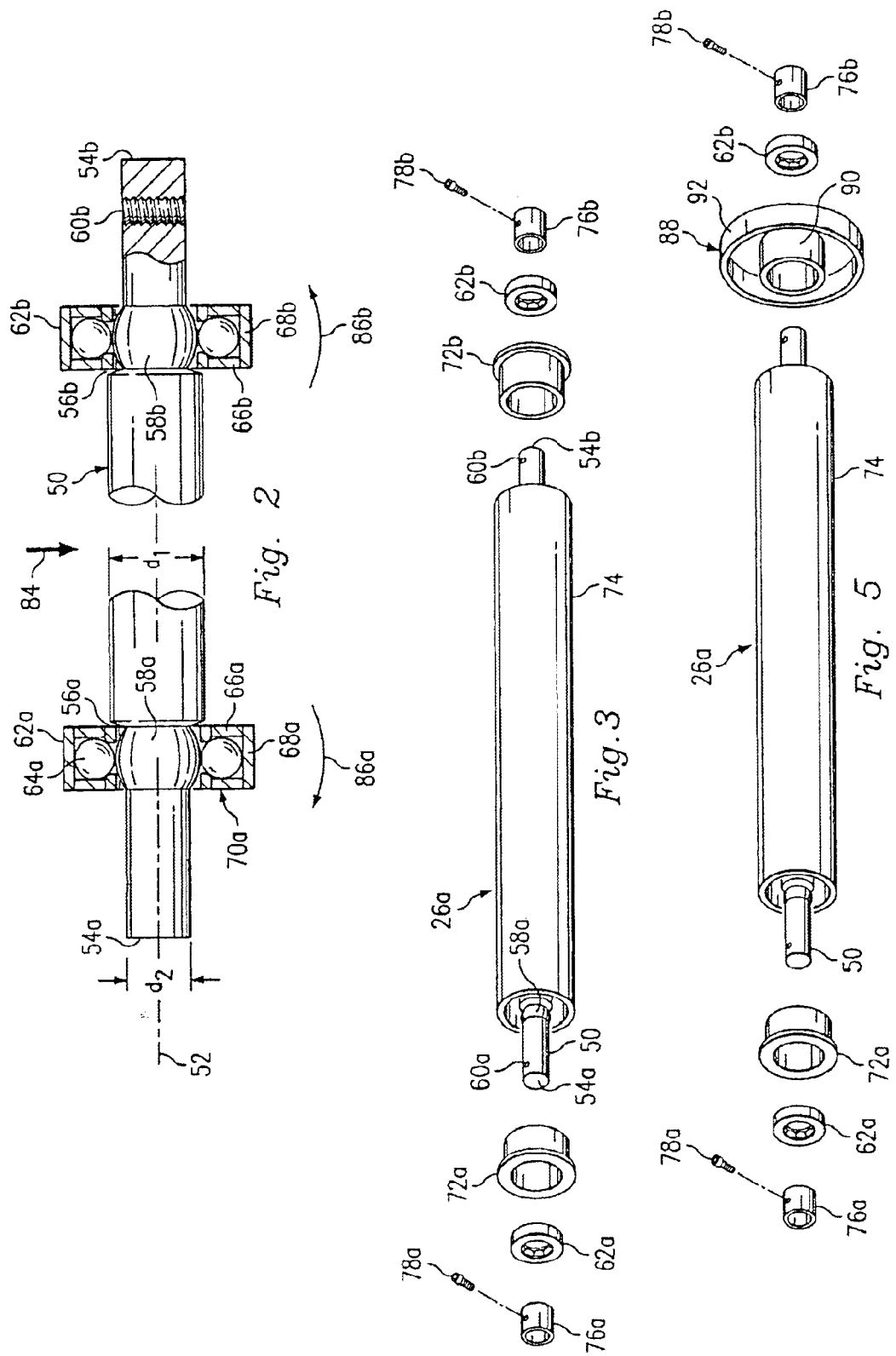

ROLLER ASSEMBLY APPARATUS AND METHOD OF USE

TECHNICAL FIELD

The present invention relates in general to roller assembly apparatuses, and specifically to roller assembly apparatuses for use in treadmills.

BACKGROUND OF THE INVENTION

Exercise enthusiasts use treadmills that convey, on an endless track, a surface upon which they may run, jog or walk in place. Treadmills typically have a conveyor belt that rotates around a front and a rear roller assembly. Normally, each roller assembly has a fixed shaft with an outer tube disposed around it. The outer tube rotates on bearing assemblies which are supported by the fixed shaft. The bearing assemblies are typically ball bearing systems that comprise an inner and outer race, a series of balls and a cage to support the balls.

In order to eliminate slippage when users are stepping on the conveyor belt, the conveyor belt is put into tension. The tensioning of the belt causes the fixed shafts of the roller assemblies to bend or "arc" towards each other. The bending in the center of the shaft causes the ends of the shaft to deflect in the opposite direction. This deflection causes the ends of the ends of the shafts to exert an excessive pressure on the inner race of the bearing assemblies. The excessive pressure often causes the ball bearings and the races to become brittle. Thus, the bearing assemblies may be easily damaged and chipping and brinnelling may occur. Brinnelling is a denting of the race following an excessive load. This brinnelling, although it has no major effect on life, but at comparatively light loads, causes a great increase in noise. On the other hand, chipping of the hardened brittle ball bearings will eventually lead to bearing noise, roughness, and ultimately failure.

Most treadmills, in a certain price range, use similar front and rear rollers as described above. Shaft arcing in rollers has been a problem for many years. Recently, shaft arcing has been reduced by increasing the diameter of the shaft. However, it is often cost prohibitive to use shafts with large enough diameters to completely eliminate arcing. What is needed, therefore, is a means of distributing the loads within the roller apparatus that will reduce pressure and resistance on the bearing members.

BRIEF SUMMARY OF THE INVENTION

The previously mentioned needs are fulfilled with certain embodiments of the present invention. Accordingly, there is provided in one embodiment, a roller apparatus, comprising: a shaft with raised surfaces on each end, a rotatable tube disposed around a portion of the shaft, and bearing assemblies. The bearing assemblies are disposed between the raised surfaces of the shaft and the rotatable tube such that the inner surfaces of the bearing assemblies contact the raised surfaces which allows the inner surfaces of the bearing assemblies to rotate on the raised surfaces, thus reducing forces on the inner races of the bearing assemblies caused by the arcing of the respective shaft.

These and other features, and advantages, will be more clearly understood from the following detailed description taken in conjunction with the accompanying drawings. It is important to note the drawings are not intended to represent the only form of the invention.

BRIEF DESCRIPTION OF THE DRAWINGS

FIG. 2 is a partial sectional view of one embodiment of a shaft used in one embodiment of the present invention.

FIG. 3 is an exploded view of an embodiment of a roller assembly in FIG. 1 using one embodiment of the present invention.

FIG. 5 is a exploded view of a second embodiment of a roller assembly in FIG. 1.

DETAILED DESCRIPTION OF THE INVENTION

The present invention provides a unique apparatus and method for using roller assemblies. It is understood, however, that the following disclosure provides many different embodiments, or examples, for implementing different features of the invention. Specific examples of components, and arrangements are described below to simplify the present disclosure. These are, of course, merely examples and are not intended to limit the invention from that described in the claims. Well-known elements are presented without detailed description in order not to obscure the present invention in unnecessary detail. For the most part, details unnecessary to obtain a complete understanding of the present invention have been omitted inasmuch as such details are within the skills of persons of ordinary skill in the relevant art.

Figure 1:
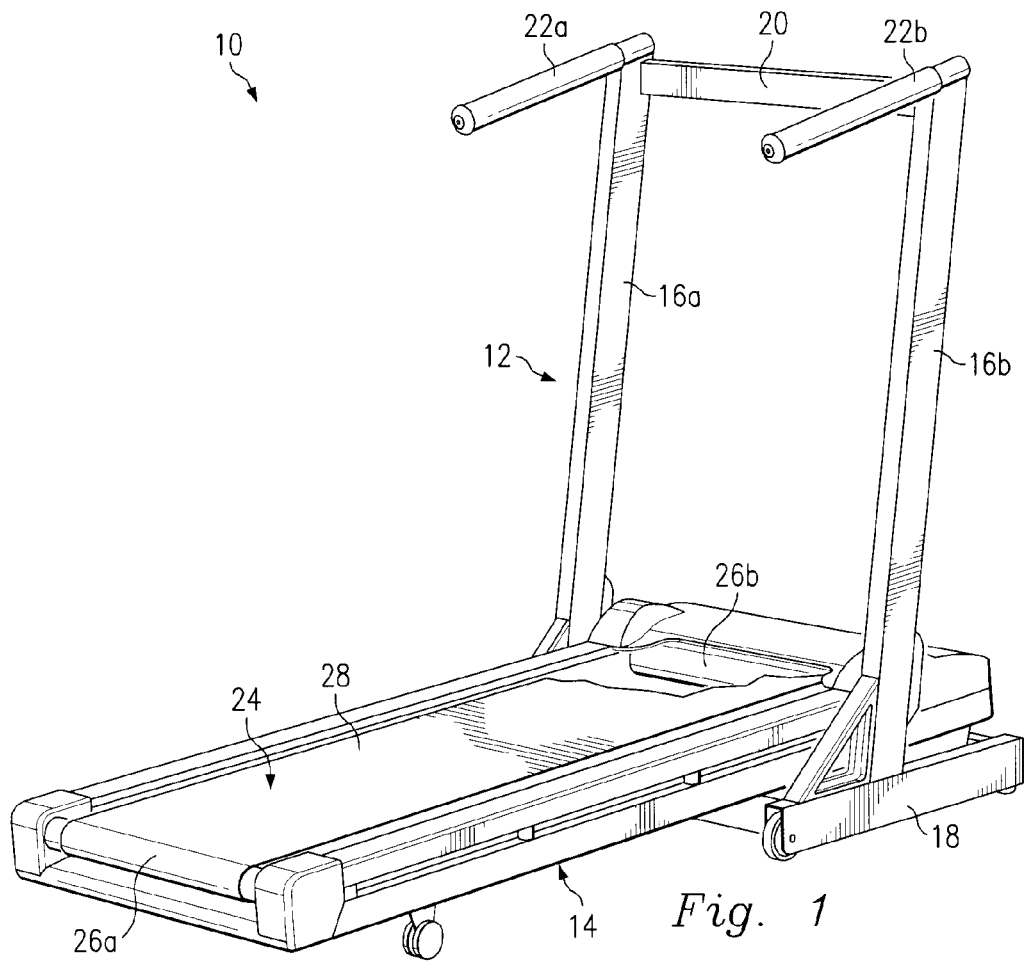
FIG. 1 is a view of a treadmill incorporating one embodiment of the present invention.

Turning now to FIG. 1 of the figures, the reference numeral 10 refers, in general to an exemplary treadmill 10 which incorporates one aspect of the present invention. In this embodiment, the treadmill 10 comprises an upright assembly 12 and a deck frame 14. The upright assembly 12 includes two upright members 16a and 16b having lower ends attached to a base 18 that is supported on the floor. A cross member 20 connects the upper ends of the upright members 16a and 16b. A pair of hand grip members 22a and 22b are attached to the upper ends of the upright members 16a and 16b, respectively, to provide support to the user of the treadmill 10. The deck frame 14 supports a conveyor system 24 having two roller assemblies 26a and 26b. A conveyor belt 28 rotates around the pair of roller assemblies 26a and 26b.

In one embodiment, each of the roller assemblies 26a and 26b has a central or roller shaft. Such a roller shaft 50 is illustrated in FIG. 2. The roller shaft 50 has a longitudinal axis 52 running concentrically through the center of the shaft. The roller shaft 50 has a center diameter "d1" which is larger than a diameter "d2" at its ends. Proximate to ends 54a and 54b of the roller shaft 50, there are abrupt shoulders or chamfers 56a and 56b respectively. The chamfers 56a and 56b allow for the diameter of the roller shaft to transition from the larger diameter d1 to the smaller diameter d2. Proximate to chamfer 56a, there is a raised surface 58a. In the illustrative embodiment, the raised surface 58a is a rounded or bulbous in shape. Similarly, proximate to end 54b, there is a raised surface 58b. Between each end and the raised surfaces, there are screw holes 60a (not shown) and 60b. As those skilled in the art will appreciate, the roller shaft 50 may be made of any material of sufficient strength and stiffness, including various metal alloys or stainless steel.

Bearing assemblies 62a and 62b are disposed around the raised surfaces 58a and 58b, respectively. The bearing assemblies 62a and 62b may be comprised of subcomponents. For instance, the bearing assembly 62a may have a plurality of ball bearings 64a disposed between an inner race 66a and an outer race 68a. There may also be a cage 70a to support the ball bearings and to separate the inner race 66a from the outer race 68a. Such bearing assemblies are well known in the art.

In FIG. 3, there is an exploded view of an exemplary embodiment of the roller assembly 26a incorporating the roller shaft 50. The bearing assemblies 62a and 62b are disposed on the roller shaft 50 proximate to each end 54a and 54b of the roller shaft. Bearing housings 72a and 72b surround and house the bearing assemblies 62a and 62b. In some embodiments, the bearing housings 72a and 72b are "rigid." As used in this application, the term "rigid" means that the housings have sufficient thickness and/or be made out of a material having sufficient strength and stiffness to transfer forces imposed by a rotatable tube 74 without excessive deflection. Such a suitable material is hardened plastic, aluminum, steel or another metal alloy. The required thickness is a function of the material, the diameter of the housing, and the loads imposed on the housing. Given these parameters, those skilled in the art can readily determine the required thickness.

The rotatable tube 74 is concentrically disposed around the roller shaft 50 and is supported by the bearing housings 72a and 72b. Adjacent to the bearing assemblies 62a and 62b, there are sleeves 76a and 76b, respectively. The inner diameter of the sleeves 76a and 76b is slightly larger than the diameter d2 of the roller shaft 50 such that the sleeves can slide over the ends of the shaft. Screws 78a and 78b are inserted into the screw holes 60a and 60b of the shaft 50, respectively, to secure the sleeves 76a and 76b along the shaft.

Figure 4:
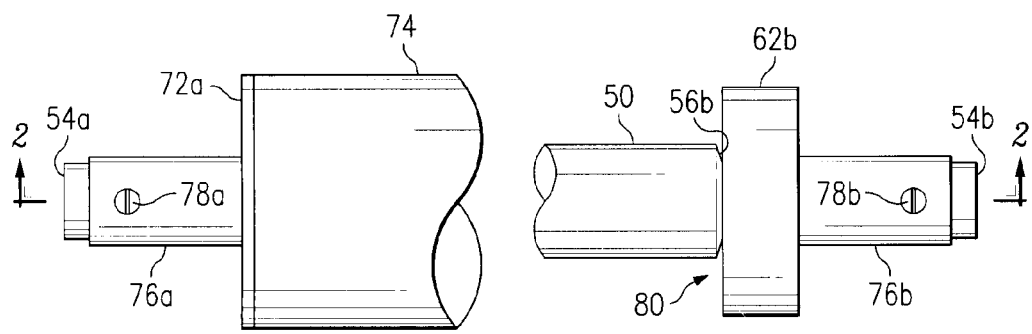
FIG. 4 is a front view of the shaft in FIG. 2.

FIG. 4 illustrates the roller assembly 26a in a partially assembled condition. When assembled, the sleeve 76a is disposed on the roller shaft 50 proximate to the end 54a and secured by the screw 78a. Similarly, the sleeve 76b is disposed on the roller shaft 50 proximate to end 54b and secured by the screw 78b. At end 54a, FIG. 4 illustrates the bearing housing 72a supporting the rotatable tube 74. At end 54b, the bearing housing 72b and the rotatable tube 74 have been removed so as not to obscure the bearing assembly 62b and the shaft 50. In the embodiment illustrated in FIG. 4, the sleeve 76b functions as a means for positioning and securing the bearing assembly along the longitudinal axis 52 with respect to the roller shaft 50. For instance, one side 80 of the bearing assembly 62b is next to the chamfer 56b. One the other side, the bearing assembly 62b abuts the sleeve 76b. The sleeve 76b is secured longitudinally be the screw 78b. Thus, when assembled, the bearing assembly 62b can rotate with respect to the roller shaft 50, but it cannot move longitudinally with respect to the roller shaft 50. The bearing assemblies 62a and 62b, therefore, allow the rotatable tube 74 to rotate with respect to the roller shaft 50.

A manner of using the roller assembly apparatus can be demonstrated by showing it as a member of a treadmill, as illustrated in FIG. 1. During operation, the exercise enthusiast runs on the conveyor belt 28 and supports him or herself with the hand grip members 22a and 22b. The conveyor belt 28 is tensioned between the roller assemblies 26a and 26b to prevent slippage. When the conveyor belt 28 is tensioned, the roller assemblies 26a and 26b are subjected to a bending force that is transferred to the shaft 50. In response to the force, the ends 54a and 54b of the shaft 50 tend to deflect in a direction 84 (see FIG. 2), and thus, the ends of the shaft rotates in directions 86a and 86b with respect to the bearing assemblies 62a and 62b. Normally, this rotation would cause chipping or brinnelling on the edge of the inner race 66a. However, in the illustrative embodiment, the bearing assemblies 62a and 62b are in contact and rotating around the raised surfaces 58a and 58b, respectively. The positioning of the inner races 66a and 66b on top of the raised surfaces 58a and 58b, respectively, allows the shaft to freely rotate in a direction 86a and 86b. This allowance for rotation prevents isolated pressures on the edges of the races 66a and 66b and thus, prevents their failure.

Additionally, in this embodiment, the bearing housings 72a and 72b (see FIG. 3) are made of a rigid material which provides additional support to the ends of the roller assemblies 54a and 54b. This additional support assists in preventing deflection of the shaft 50 when the conveyor belt 28 is tensioned. By preventing deflections, the bearing housings 72a and 72b absorb a portion of the bending load that would otherwise be transferred to the bearing assemblies 62a and 62b.

Turning now to FIG. 5, there is illustrated a second embodiment of one of the roller assemblies 26a and 26b. For brevity and clarity, a description of those parts which are identical or similar to those described in connection with the embodiment illustrated in FIGS. 2, 3 and 4, will not be repeated here. The second embodiment is similar to the previous embodiment, except that it includes a drive pulley 88 proximate to one end of the roller assembly instead of the bearing housing 72b. The drive pulley 88 has an inner cylindrical structure 90 that is disposed between the outer race 68b of the bearing assembly 62b and the inner surface of the rotatable tube 74. An outer rim 92 is of sufficient diameter to allow for the drive pulley 88 to be driven by a driver such that the roller assembly may be rotated, which in turn, drives the conveyor belt 24.

The roller assemblies 26a and 26b and their different embodiments may be interchangeable for use on the front end and rear end of the treadmill 10. FIG. 1 depicts the roller assembly 26a at the front end and the roller assembly 26b at the rear end. The drive pulley 88 can be incorporated into the left or right side of the roller assembly 26a or 26b depending on the desired operation of the treadmill 10. Further, the different elements of the embodiments, such as the rotatable tube 74, are interchangeable between different embodiments of the invention.

Although only a few exemplary embodiments of this invention have been described in detail above, those skilled in the art will readily appreciate that many modifications are possible in the exemplary embodiments. Accordingly, all such modifications are intended to be included in the scope of this invention as defined in the following claims.

What is claimed is:

1. A treadmill, comprising:
   an upright assembly,
   a frame deck coupled to the upright assembly,
   a conveyor belt supported by the frame deck, and
   at least one roller apparatus coupled to the frame deck and supporting the conveyor belt, the roller apparatus comprising:
      a shaft having at least one raised circumferential surface located proximate to an end of the shaft,
      a rotatable tube disposed around a portion of the shaft,
      a bearing assembly with an inner circumferential surface and an outer circumferential surface, wherein the bearing assembly is disposed between the raised surface and an interior surface of the rotatable tube such that the inner circumferential surface of the bearing assembly contacts the raised surface of the shaft.

2. The apparatus of claim 1, further comprising a bearing housing, wherein a portion of the bearing housing is disposed between the outer circumferential surface of the bearing assembly and the interior surface of the rotatable tube.

3. The apparatus of claim 2 wherein the bearing housing is made from a rigid material.

4. The apparatus of claim 1 wherein the rigid material is selected from the group consisting of zinc, aluminum, steel, and hardened plastic.

5. The apparatus of claim 2 wherein the bearing housing is a adapted to be coupled to a drive pulley.

6. The apparatus of claim 1, wherein the raised surface is in rounded bulbous shape.

7. The apparatus of claim 1, wherein the raised surface has a longitudinal width smaller than the longitudinal width of the inner surface of the bearing assembly, such that the shaft can deflect and the ends of the shaft can rotate with respect to the bearing surface without causing pressure to be applied to an edge of the inner surface of the bearing assembly.

8. The apparatus of claim 1, wherein the shaft has at least one shoulder proximate to the raised surface, wherein the diameter of the at least one shoulder is adapted to prevent longitudinal movement of the bearing assembly in a first longitudinal direction along the shaft.

9. The apparatus of claim 8, further including:
   at least one cylindrical sleeve surrounding an end portion of the shaft, wherein the at least one sleeve is adapted to prevent longitudinal movement of the bearing assembly in a second longitudinal direction, and
   a fastening mechanism coupled to the shaft and the at least one cylindrical sleeve, wherein the fastening mechanism is adapted to secure to the at least one sleeve to he shaft.

10. The treadmill of claim 1, wherein the upright assembly includes:
   a base,
   a first upright member coupled to the base,
   a second upright member coupled to the base,
   a cross member connecting the first upright member and the second upright member,
   a first hand grip member attached to the first upright member, and a second hand grip member attached to the second upright member.

\* \* \* \* \*